United States Patent
Cohen et al.

(10) Patent No.: US 11,887,153 B2
(45) Date of Patent: *Jan. 30, 2024

(54) METHOD FOR ACCOUNTING FOR IMPACT OF UNCERTAINTY IN CUSTOMER SURVEYS

(71) Applicant: JPMorgan Chase Bank, N.A., New York, NY (US)

(72) Inventors: Naftali Y Cohen, New York, NY (US); Prashant P Reddy, Madison, NJ (US); Simran Lamba, Manhattan, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,187

(22) Filed: Jun. 16, 2022

(65) Prior Publication Data
US 2022/0309531 A1 Sep. 29, 2022

Related U.S. Application Data

(63) Continuation of application No. 17/071,523, filed on Oct. 15, 2020, now Pat. No. 11,392,982.

(51) Int. Cl.
*G06Q 30/00* (2023.01)
*G06Q 30/0242* (2023.01)
*G06Q 10/0631* (2023.01)
*G06Q 30/016* (2023.01)

(52) U.S. Cl.
CPC ... *G06Q 30/0245* (2013.01); *G06Q 10/06315* (2013.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 2007/0067210 | A1* | 3/2007 | Rishell | G06Q 30/0203 705/7.33 |
| 2010/0017132 | A1* | 1/2010 | Glinsky | G06Q 10/0635 702/6 |
| 2015/0262207 | A1* | 9/2015 | Rao | G06Q 30/0245 705/7.32 |
| 2017/0140417 | A1* | 5/2017 | Li | G06Q 30/0243 |

* cited by examiner

*Primary Examiner* — Matthew T Sittner
(74) *Attorney, Agent, or Firm* — GREENBLUM & BERNSTEIN, P.L.C.

(57) ABSTRACT

A method for identifying, contracting, evaluating, bounding, and filtering out uncertainty in survey data is provided. The method includes: receiving survey responses with respect to a customer survey; constructing a simulated numerical model that replicates the structure of the original survey by using responses that are generated randomly from distribution of responses with constraint variability that specifically account for the uncertainty that arises from the subjective nature of sampling response from an ordinal range of possible options; matching between the original survey and the numerical model using a machine learning algorithm; and evaluating and filtering out the uncertainty of the original survey. In addition, a method is offered to constrain and contract the uncertainty by assigning survey responses to corresponding evenly distributed bins and by calibrating the survey responses by attaching a short textual description to each of the ordinal values in the original survey.

18 Claims, 16 Drawing Sheets

| Unbiased | Biased | |
|---|---|---|
| Promoter | 10 | Promoter |
| Promoter | 9 | Passive |
| Detractor | 6 | Passive |
| Detractor | 3 | Detractor |
| Promoter | 9 | Promoter |
| Passive | 7 | Passive |
| Detractor | 2 | Detractor |
| Passive | 7 | Detractor |
| Passive | 8 | Passive |
| ... | ... | ... |

METHOD FOR ACCOUNTING FOR IMPACT OF UNCERTAINTY IN CUSTOMER SURVEYS

CROSS-REFERENCE TO RELATED APPLICATIONS

This application is a continuation of U.S. application Ser. No. 17/071,523, filed Oct. 15, 2020, which is hereby incorporated by reference in its entirety.

BACKGROUND

1. Field of the Disclosure

This technology generally relates to methods and systems for accounting for the impact of uncertainty in customer surveys, and more particularly, to methods and systems for identifying and quantifying the uncertainty in an ordinal customer survey by augmenting the survey with a corresponding synthetic survey with constraint variability.

2. Background Information

The Net Promoter Score (NPS) is an index ranging between −100 to +100 and is used as a proxy for assessing overall customer satisfaction and loyalty to a company or its services. The NPS is considered by many to be the single most reliable indicator of a firm's growth compared to other loyalty metrics, such as customer satisfaction. NPS is widely adopted by thousands of well-established companies, including Amazon, Apple, Netflix, Walmart, and Vanguard. To calculate the NPS, customers are asked to answer a single question similar to the following: Customers who respond with a score of 9 or 10 are classified as Promoters, responses of 7 and 8 are labeled as Passives/Neutrals, and those who give a score of 1 to 6 are called Detractors. The NPS is then calculated by subtracting the percentage of detractors from the percentage of promoters.

NPS varies widely by industry. For example, in a 2018 study published by NICE Satmetrix, the average NPS of the Airlines industry was 44, while for the Health Insurance sector, it was only 13. However, per sector, if a company has a substantially higher NPS than its competitors, it is likely to grow at a much faster rate than its rivals.

Each company's actual NPS is unknown, but an approximation can be computed via surveys. In reality, however, survey results must be considered with care due to a variety of systematic and non-systematic biases as coverage error, sampling error, nonresponse error, measurement error, and random error. Here the focus is on the overlooked uncertainty that arises when people are asked to choose one particular choice from a range of possible options. The nature of assigning ordinal value to opinion is subjective and not universally calibrated and is thus prone to vary and introduce noise to the collected data.

Accordingly, there is a need for a methodology that accounts for the impact of such errors and the resultant uncertainty in customer surveys.

SUMMARY

The present disclosure, through one or more of its various aspects, embodiments, and/or specific features or sub-components, provides, inter alia, various systems, servers, devices, methods, media, programs, and platforms for identifying and filtering out noise in an ordinal customer survey by using a synthetic survey with constraint variability.

According to an aspect of the present disclosure, a method for evaluating and filtering the uncertainty in survey data is provided. The method is implemented by at least one processor. The method includes: receiving a plurality of survey responses with respect to a customer survey; obtaining a first set of numerical survey data based on the received plurality of survey responses; generating, by the at least one processor, a second set of numerical survey data based on a random sampling of a predetermined number of synthetically generated survey responses; adjusting, by the at least one processor, the second set of numerical survey data based on a predetermined intrinsic variability factor; computing, by the at least one processor, an estimated error value for the adjusted second set of numerical survey data; determining, by the at least one processor, an uncertainty of the first set of numerical survey data based on the computed estimated error value; and adjusting, by the at least one processor, the first set of numerical survey data based on the determined uncertainty.

Each of the first set of numerical survey data and the second set of numerical survey data may include, for each respective survey response from among the received plurality of survey responses, a corresponding numerical value that falls within a predetermined numerical range.

Each corresponding numerical value may include an integer value that falls within the predetermined numerical range.

The predetermined numerical range may include a range of between one (1) and ten (10). The predetermined intrinsic variability factor may be equal to plus-or-minus one ($\pm 1$).

The predetermined number of synthetically generated survey responses may include a set of numerical values that is uniformly distributed with respect to the predetermined numerical range.

The method may further include: dividing the predetermined numerical range into a plurality of bins, each respective bin having a corresponding numerical sub-range that does not overlap with a numerical sub-range that corresponds to any other bin from among the plurality of bins; assigning each respective survey response from among the received plurality of survey responses into a corresponding bin from among the plurality of bins based on the corresponding numerical value of the respective survey response; and when each respective survey response has been assigned to a corresponding bin, using a result of the assigning to determine a Net Promoter Score (NPS) that relates to the customer survey.

The adjusting of the first set of numerical survey data may include reassigning each respective survey response from among the received plurality of survey responses into a corresponding bin from among the plurality of bins based on an adjusted corresponding numerical value of the respective survey response, and using a result of the reassigning to determine an adjusted NPS.

The predetermined numerical range may include a range of between one (1) and ten (10), and the plurality of bins may include exactly three (3) bins.

The predetermined numerical range may include a range of between one (1) and ten (10), and the plurality of bins may include exactly two (2) bins.

The method may further include: before the receiving of the plurality of survey responses, calibrating the customer survey by associating each respective numerical value with a textual description; and transmitting the calibrated customer survey to a plurality of potential survey respondents.

According to another aspect of the present disclosure, a computing apparatus for evaluating and filtering uncertainty in survey data is provided. The computing apparatus includes a processor, a memory, and a communication interface coupled to each of the processor and the memory. The processor is configured to: receive, via the communication interface, a plurality of survey responses with respect to a customer survey; obtain a first set of numerical survey data based on the received plurality of survey responses; generate a second set of numerical survey data based on a random sampling of a predetermined number of synthetically generated survey responses; adjust the second set of numerical survey data based on a predetermined intrinsic variability factor; compute an estimated error value for the adjusted second set of numerical survey data; determine an uncertainty of the first set of numerical survey data based on the computed estimated error value; and adjust the first set of numerical survey data based on the determined uncertainty.

Each of the first set of numerical survey data and the second set of numerical survey data may include, for each respective survey response from among the received plurality of survey responses, a corresponding numerical value that falls within a predetermined numerical range.

Each corresponding numerical value may include an integer value that falls within the predetermined numerical range.

The predetermined numerical range may include a range of between one (1) and ten (10). The predetermined intrinsic variability factor may be equal to plus-or-minus one (±1).

The predetermined number of synthetically generated survey responses may include a set of numerical values that is uniformly distributed with respect to the predetermined numerical range.

The processor may be further configured to: divide the predetermined numerical range into a plurality of bins, each respective bin having a corresponding numerical sub-range that does not overlap with a numerical sub-range that corresponds to any other bin from among the plurality of bins; assign each respective survey response from among the received plurality of survey responses into a corresponding bin from among the plurality of bins based on the corresponding numerical value of the respective survey response; and when each respective survey response has been assigned to a corresponding bin, use a result of the assigning to determine a Net Promoter Score (NPS) that relates to the customer survey.

The processor may be further configured to adjust of the first set of numerical survey data by reassigning each respective survey response from among the received plurality of survey responses into a corresponding bin from among the plurality of bins based on an adjusted corresponding numerical value of the respective survey response, and to use a result of the reassigning to determine an adjusted NPS.

The predetermined numerical range may include a range of between one (1) and ten (10), and the plurality of bins may include exactly three (3) bins.

The predetermined numerical range may include a range of between one (1) and ten (10), and the plurality of bins may include exactly two (2) bins.

The processor may be further configured to: before the plurality of survey responses is received, calibrate the customer survey by associating each respective numerical value with a textual description; and transmit, via the communication interface, the calibrated customer survey to a plurality of potential survey respondents.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is a synthetically generated data set with respect to a customer survey.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
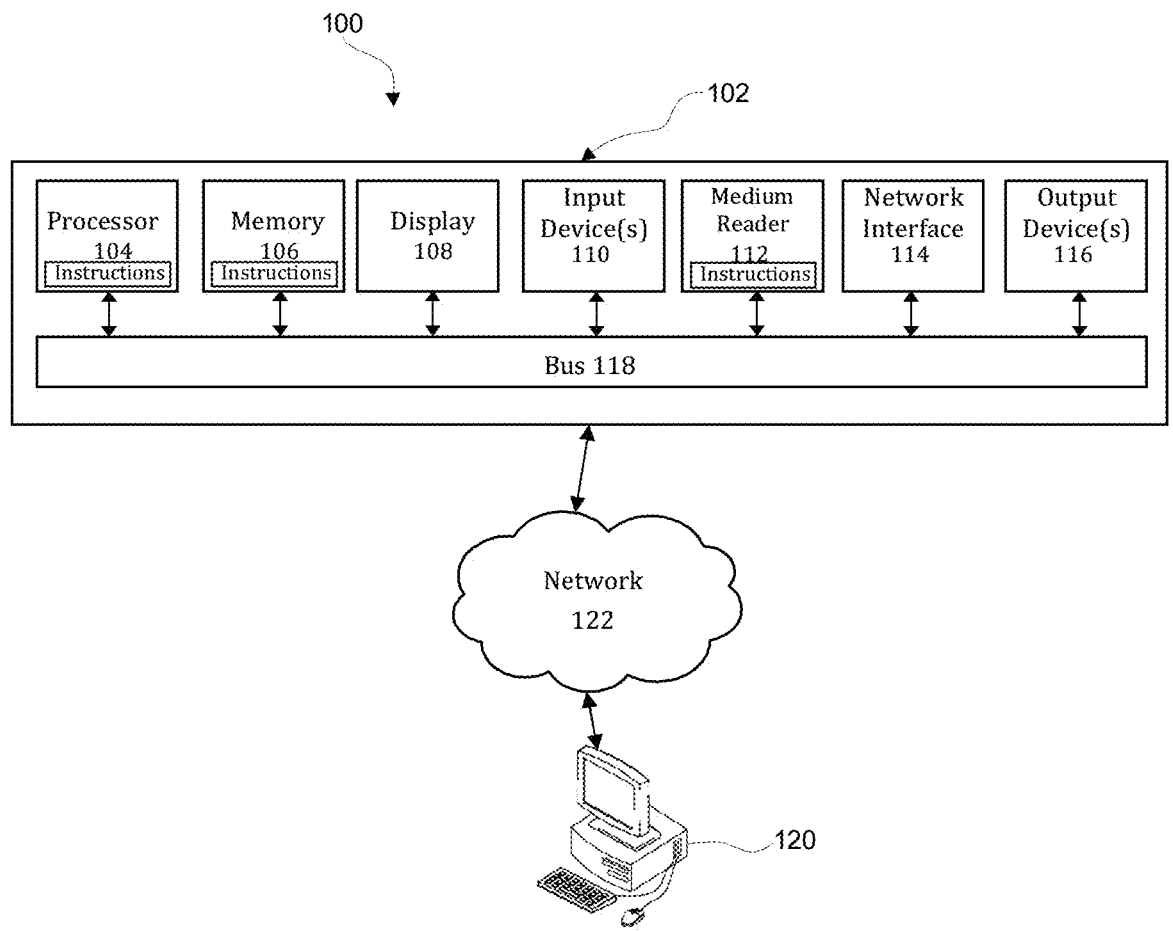
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for identifying and filtering out noise in an ordinal customer survey by using a synthetic survey with constraint variability.

Figure 2:
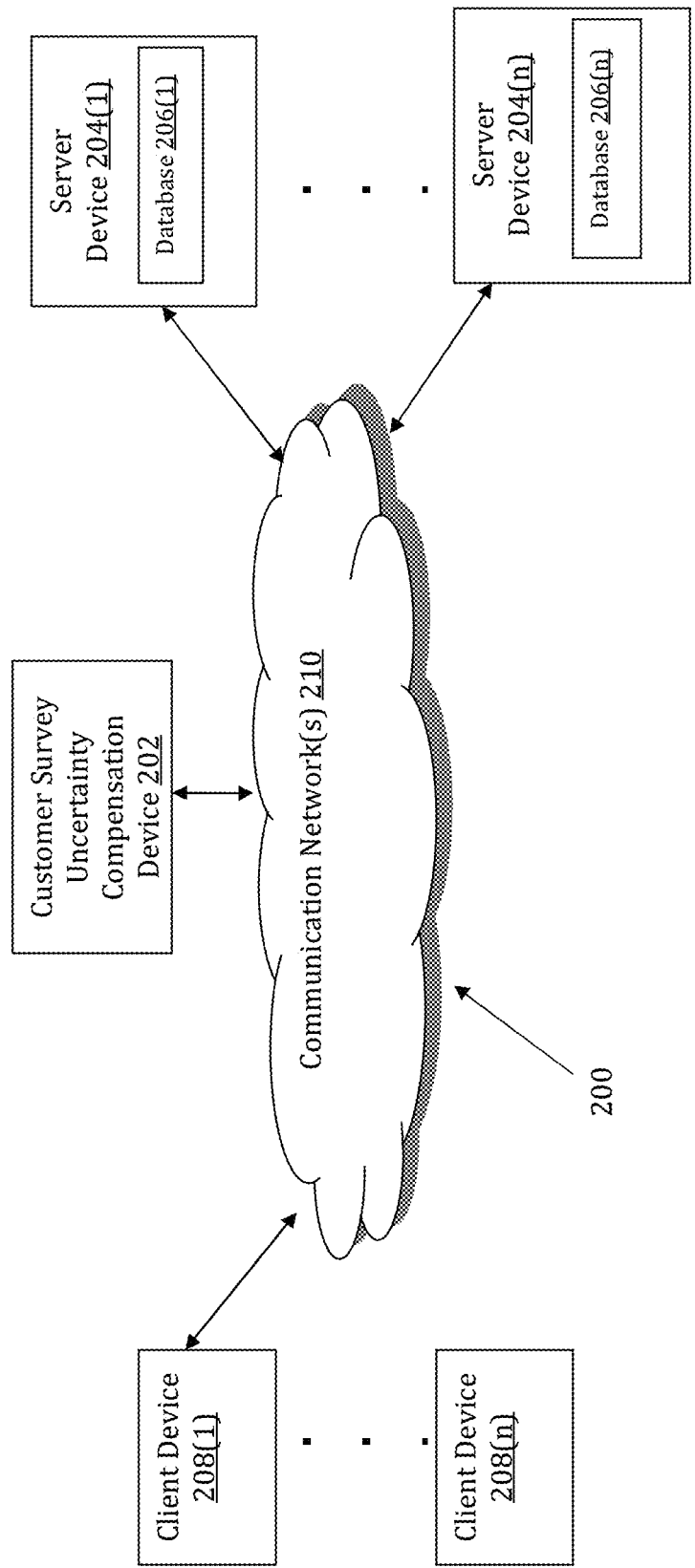
FIG. 2 illustrates an exemplary diagram of a network environment.

Referring to FIG. 2, a schematic of an exemplary network environment 200 for implementing a method for identifying and filtering out noise in an ordinal customer survey by using a synthetic survey with constraint variability is illustrated. In an exemplary embodiment, the method is executable on any networked computer platform, such as, for example, a personal computer (PC).

The method for identifying and filtering out noise in an ordinal customer survey by using a synthetic survey with constraint variability may be implemented by a Customer Survey Uncertainty Compensation (CSUC) device 202. The CSUC device 202 may be the same or similar to the computer system 102 as described with respect to FIG. 1. The CSUC device 202 may store one or more applications that can include executable instructions that, when executed by the CSUC device 202, cause the CSUC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CSUC device 202 itself, may be located in virtual server(s) running in a cloud-based computing environment rather than being tied to one or more specific physical network computing devices. Also, the application(s) may be running in one or more virtual machines (VMs) executing on the CSUC device 202. Additionally, in one or more embodiments of this technology, virtual machine(s) running on the CSUC device 202 may be managed or supervised by a hypervisor.

In the network environment 200 of FIG. 2, the CSUC device 202 is coupled to a plurality of server devices 204(1)-204(n) that hosts a plurality of databases 206(1)-206(n), and also to a plurality of client devices 208(1)-208(n) via communication network(s) 210. A communication interface of the CSUC device 202, such as the network interface 114 of the computer system 102 of FIG. 1, operatively couples and communicates between the CSUC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CSUC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CSUC devices that efficiently implement a method for identifying and filtering out noise in an ordinal customer survey by using a synthetic survey with constraint variability.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CSUC device 202 may be a standalone device or integrated with one or more other devices or apparatuses, such as one or more of the server devices 204(1)-204(n), for example. In one particular example, the CSUC device 202 may include or be hosted by one of the server devices 204(1)-204(n), and other arrangements are also possible. Moreover, one or more of the devices of the CSUC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CSUC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store customer survey data and machine learning algorithm application-specific data that is usable for identifying and filtering out noise in an ordinal customer survey by using a synthetic survey with constraint variability.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CSUC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CSUC device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CSUC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CSUC device 202, the server devices 204(1)-204(n), or the client devices 208(1)-208(n), for example, may be configured to operate as virtual instances on the same physical machine. In other words, one or more of the CSUC device 202, the server devices 204(1)-204(n), or the client devices 208(1)-208(n) may operate on the same physical device rather than as separate devices communicating through communication network(s) 210. Additionally, there may be more or fewer CSUC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
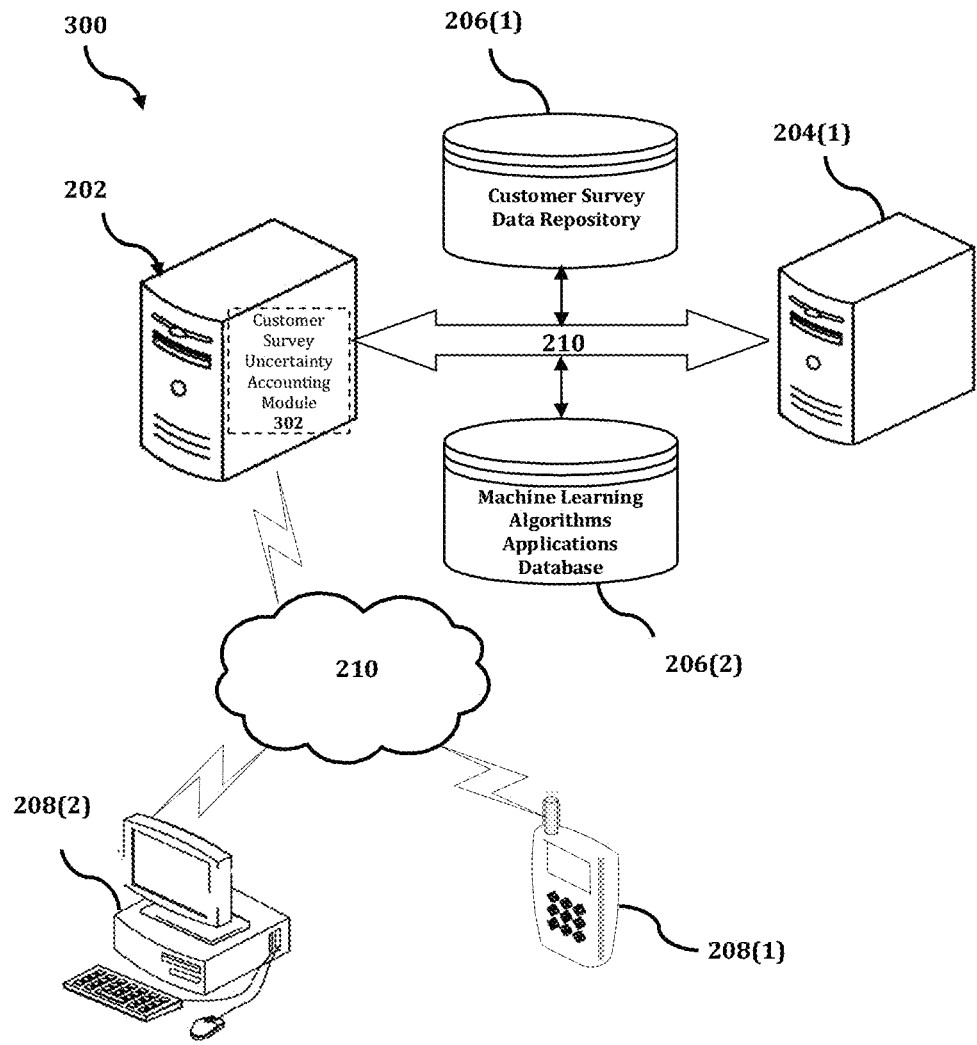
FIG. 3 shows an exemplary system for implementing a method for identifying and filtering out noise in an ordinal customer survey.

The CSUC device 202 is described and shown in FIG. 3 as including a customer survey uncertainty accounting module 302, although it may include other rules, policies, modules, databases, or applications, for example. As will be described below, the customer survey uncertainty accounting module 302 is configured to implement a method for identifying and filtering out noise in an ordinal customer survey by using a synthetic survey with constraint variability in an automated, efficient, scalable, and reliable manner.

An exemplary process 300 for implementing a method for identifying and filtering out noise in an ordinal customer survey by using a synthetic survey with constraint variability by utilizing the network environment of FIG. 2 is shown as being executed in FIG. 3. Specifically, a first client device 208(1) and a second client device 208(2) are illustrated as being in communication with CSUC device 202. In this regard, the first client device 208(1) and the second client device 208(2) may be "clients" of the CSUC device 202 and are described herein as such. Nevertheless, it is to be known and understood that the first client device 208(1) and/or the second client device 208(2) need not necessarily be "clients" of the CSUC device 202, or any entity described in association therewith herein. Any additional or alternative relationship may exist between either or both of the first client device 208(1) and the second client device 208(2) and the CSUC device 202, or no relationship may exist.

Further, CSUC device 202 is illustrated as being able to access a historical customer survey data repository 206(1) and a machine learning algorithm applications database 206(2). The customer survey uncertainty accounting module 302 may be configured to access these databases for implementing a method for identifying and filtering out noise in an ordinal customer survey by using a synthetic survey with constraint variability.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CSUC device 202 via broadband or cellular communication. Of course, these embodiments are merely exemplary and are not limiting or exhaustive.

Upon being started, the customer survey uncertainty accounting module 302 executes a process for identifying and filtering out noise in an ordinal customer survey by using a synthetic survey with constraint variability. An exemplary process for identifying and filtering out noise in an ordinal customer survey is generally indicated at flowchart 400 in FIG. 4.

Figure 4:
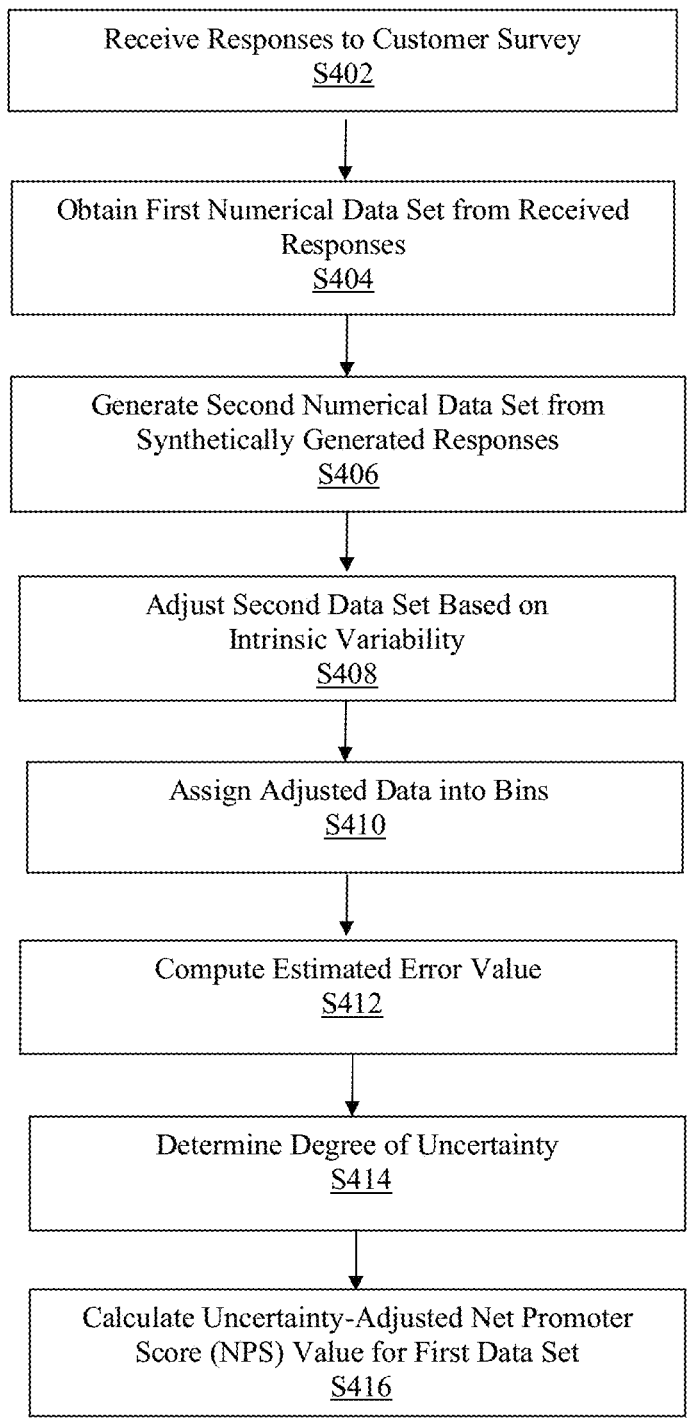
FIG. 4 is a flowchart of an exemplary process for implementing a method for identifying and filtering out noise in an ordinal customer survey.

In the process 400 of FIG. 4, at step S402, the customer survey uncertainty accounting module 302 receives a plurality of survey responses with respect to a customer survey. In an exemplary embodiment, the customer survey includes at least one question that calls for a numerical value as an answer, and the numerical value falls within a predetermined numerical range. For example, the numerical value may be an integer that falls within the range of between one (1) and ten (10).

At step S404, the customer survey uncertainty accounting module 302 obtains a first set of numerical survey data based on the received plurality of responses. For example, if a particular survey includes one question that calls for an answer that corresponds to a number between 1 and 10, and 750 people respond to the survey, then the first set of numerical survey includes 750 values within the range of 1-10.

At step S406, the customer survey uncertainty accounting module 302 generates a second set of numerical survey data based on a random sampling of a predetermined number of synthetically generated survey responses. In an exemplary embodiment, the synthetically generated survey responses may include a set of numerical values that is uniformly distributed with respect to a predetermined range. For example, based on the same particular survey as described above with respect to step S404, there may be a pool of 10,000 synthetically generated survey responses for which the numerical values are uniformly distributed within the range of 1-10, and the customer survey uncertainty module 302 may randomly select 750 of these 10,000 synthetically generated survey responses in order to generate the second data set.

At step S408, the customer survey uncertainty accounting module 302 adjusts the second data set based on a predetermined intrinsic variability factor. In an exemplary embodiment, the intrinsic variability factor may be a numerical value by which any given survey response may vary from what is deemed to be a more accurate expression of the survey respondent. For example, based on the same particular survey as described above with respect to steps S404 and S406, there may be a predetermined intrinsic variability factor that is equal to plus-or-minus one (i.e., ±1), and as a result, a survey response that includes a value of 7 as an answer to the survey question may be deemed as being more accurately understood as being equally likely to be equal to 6, 7, or 8 (i.e., 7−1, 7, or 7+1). Thus, in step S408, each of the data points that is based on the synthetically generated survey responses is adjusted by either adding 1, adding zero (0), or subtracting 1 from the numerical value that corresponds to that response. Alternatively, the predetermined intrinsic variability factor may be equal to other plus-or-minus values, such as, for example, ±2, ±2.5, ±3, ±4, or ±5.

At step S410, the customer survey uncertainty accounting module 302 divides the predetermined numerical range into a plurality of bins that correspond to numerical sub-ranges, and then assigns the adjusted data from the second data set into the corresponding bins. The number of bins may be, for example, equal to two (2), (3), or any other number that is suitable for the overall range and/or the overall objective of the customer survey. For example, based on the same particular survey as described above, the 1-10 range may be divided into three bins: a first bin that covers the sub-range of 1 to 6; a second bin that covers the sub-range of 7 and 8; and a third bin that covers the sub-range of 9 and 10. As a result, all adjusted data points within the 1-6 sub-range would be assigned to the first bin; all adjusted data points within the 7-8 sub-range would be assigned to the second bin; and all adjusted data points within the 9-10 range would be assigned to the third bin.

At step S412, the customer survey uncertainty accounting module 302 computes an estimated error value for the adjusted second data set. In an exemplary embodiment, the computation of the estimated error value is based on a comparison between the raw, unadjusted second data set and the adjusted second data set, and as a result, the estimated error value generally increases commensurately with an increase in the intrinsic variability value. Then, at step S414, the customer survey uncertainty accounting module 302 determines a degree of uncertainty of the first data set by using the estimated error value as computed with respect to the second data set.

At step S416, the customer survey uncertainty accounting module 302 adjusts the first data set based on the determined uncertainty. In an exemplary embodiment, the determined uncertainty is applied to the first data set in order to determine the correct bins to which each data point belongs, and the number of responses in each bin may be used to calculate an uncertainty adjusted NPS value for the survey.

In an exemplary embodiment, in addition to the customer survey including at least one question that calls for a numerical value that falls within a predetermined numerical range as an answer, the customer survey may also include a set of possible answer choices that include both a numerical value and an associated textual description. In this aspect, the customer survey may be deemed to be "calibrated" by virtue of the inclusion of the textual descriptions.

Regarding customer survey results, in an exemplary embodiment, all systematic bias is assumed to be negligible, and as such, the present disclosure focuses on non-systematic biases such as coverage error, sampling error, nonresponse error, measurement error, and random error. Each respondent's opinion may be defined in terms of a probability distribution. That is, if respondents always respond to the same questions in the same way, this means that their opinion distributions follow a delta function that is centered at their true opinion. Practically, it is more natural to relax this assumption and assume that on average respondents have consistent opinions, but their opinions follow wider probability distributions. For example, suppose that a responder is a genuine promoter of a brand, and the survey asks the following question: "On a scale of 1-10, how likely are you to recommend our brand to a friend or colleague?" In the framework of this question, such a customer will respond with a 10 in the ordinal survey. However, if this customer is presented with an infinite number of surveys with the same exact question, there is a question as to whether the customer would mark 10 each time. Generally, it is assumed that customers are individuals who, on average, express their opinions consistently. The question to be asked is what is the effect of sampling, in a given survey, from the population of each respondent's opinion distribution? Sampling from each person's opinion invokes the notion of inherent variability. The question of whether this noise cancels out or compounds is examined, in particular by using the common practice of unevenly-spaced binning of ordinal responses. In the following examples, the survey responses are used to label the data, and the focus is on the effect of learning from non-systematic noisy labels.

The present disclosure concentrates on data and on the standard industry practice of measuring and assessing customer satisfaction using the NPS index. There is a focus on the case where the NPS survey responses are ordinal and segmented into unevenly-spaced bins. In an exemplary embodiment, it may be demonstrated how an almost-exponential decrease in the classification performance can be estimated in real data. Various bin designs can have a cost of up to 20% in accuracy scores. In addition, a proposed solution to reduce the non-systematic noise in survey response data by adding a short textual description to the numerical ratings is described.

Figure 5:
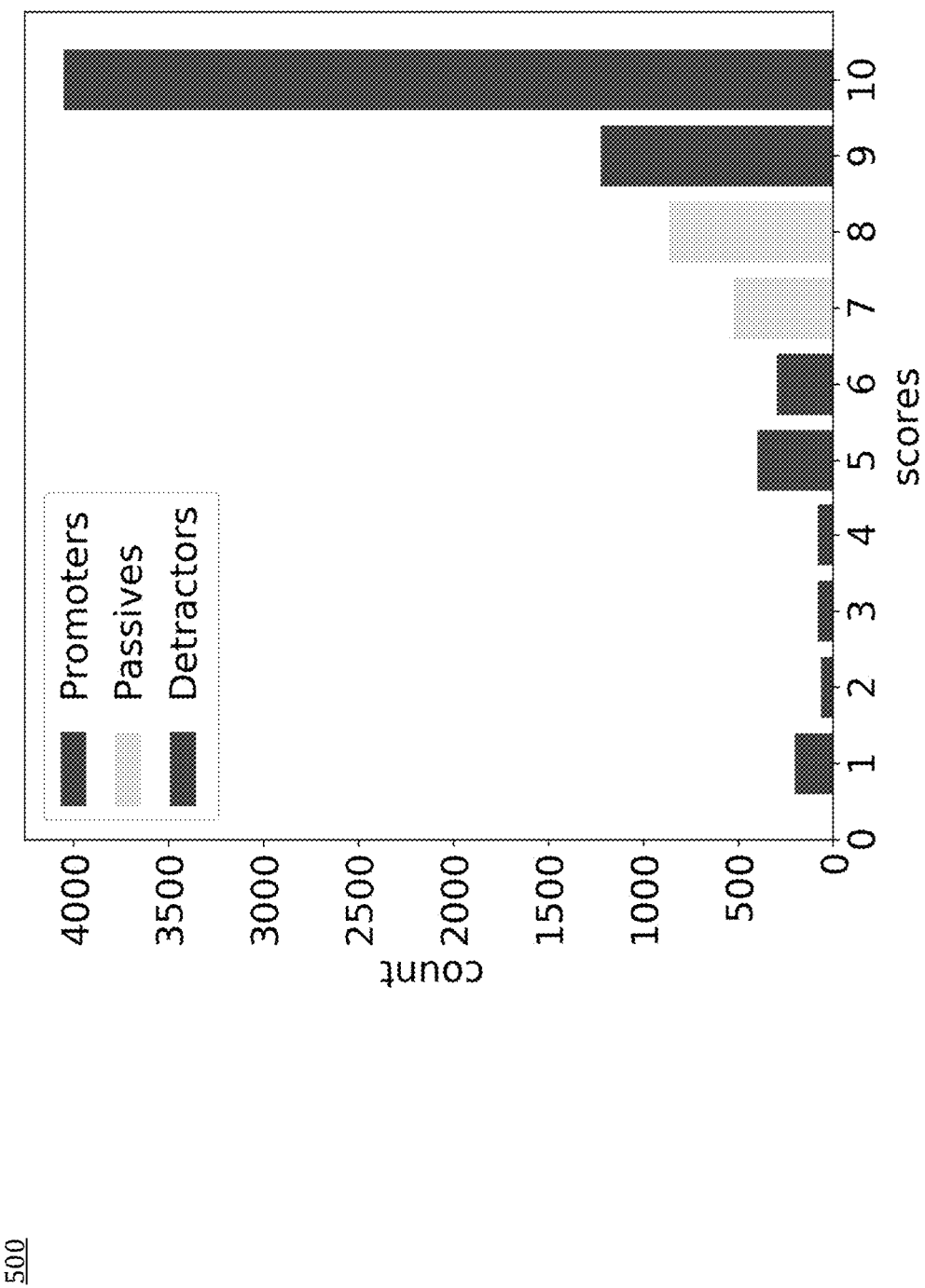
FIG. 5 is a bar graph that illustrates a set of customer survey data.

FIG. 5 is a bar graph 500 that illustrates a set of customer survey data. Referring to FIG. 5, the bar graph 500 illustrates a real NPS satisfaction survey data of a large retail bank (hereinafter referred to as BRAND). The survey aims at measuring the overall satisfaction of the customers toward BRAND. For that measure, customers were asked: "Would you recommend BRAND to a friend or colleague? Please use a scale of 1 to 10, where 1 is Definitely Not and 10 is Definitely."

The BRAND data illustrated in FIG. 5 includes the response of 10,000 unique customers. In addition to the numeric responses to the survey, each customer is characterized by numerous demographics and product usage features.

FIG. 5 shows the distribution of survey scores. As illustrated, the data is left-skewed and highly imbalanced by score. In particular, the data is almost log-normally distributed: most of the customers surveyed gave a score of 10, and a significant number of customers gave scores of 9 or 8. Only a few gave scores of 1, 5, 6, or 7, while even fewer chose to give scores of 2, 3, or 4.

In an exemplary embodiment, each survey score is categorized in the following way: customers who gave a score of 9 or 10 are considered "Promoters"; those who gave a score of 7 or 8 are considered "Passives"; and customers who picked a score in the range 1-6 are considered "Detractors."

In an exemplary embodiment, the percentages of customers in the Promoter and Detractor categories are then used to compute the overall Net Promoter Score (NPS) of the brand in accordance with the following expression:

NPS=% Promoters−% Detractors.

The NPS metric varies within a range of +100 to −100 and is considered critical, as it may be considered to be positively correlated with the future success of the brand. Using the data illustrated in FIG. 5, this brand has a very high NPS of 53.

FIG. 6 is a synthetically generated data set 600 with respect to a customer survey (hereinafter referred to as SYNTH). To create this data, a pool of 10,000 customers is assumed, and each customer is given a score that varies within a range of between 1 and 10, and that score is drawn randomly from a uniform distribution. The Unbiased column in FIG. 6 shows ten such customers and their corresponding categories, based on the above-described categorization rule.

A key assumption is that each customer has an unbiased (or systematic averaged) opinion. In an example, the true satisfaction level of the customer at the first row of FIG. 6 has the value of 10, and the customer at the second row of FIG. 6 has a true satisfaction level of 9. Both of them are genuine Promoters (i.e., by category) of the BRAND.

A second important assumption is that in a survey, people might express a different opinion than their unbiased, true one. In this aspect, there is an intrinsic non-systematic bias in the way people express themselves in surveys. If the intrinsic variability is zero, then the score a customer specifies in a survey always equals their true opinion. For example, if the above two customers with the unbiased satisfaction levels of 10 and 9 have zero intrinsic variability, then their survey responses will always be 10 and 9, respectively.

For simplicity, it is assumed that the intrinsic variability follows a discrete uniform distribution. The Biased column in FIG. 6 shows the case of a uniformly-distributed intrinsic variability of ±1 with respect to the corresponding Unbiased score. In that case, a customer with a true satisfaction level of 9 is equally likely to mark an 8, 9, or 10 (i.e., 9-1, 9, or 9+1) in a survey, whereas a person with a true opinion of 6 may, similarly, give a score of 5, 6, or 7 (i.e., 6-1, 6, or 6+1). Because of the upper bound of 10 in the survey score, a person with an unbiased satisfaction level of 10 and an intrinsic variability of ±1 might give a 9, 10, or 10 (and similarly for when encountering the lower bound): this individual has a 2/3 chance of stating 10, while only a 1/3 chance of stating 9 in a survey. Mathematically, this is formulated by applying a simple minimum-maximum operator on the scores that are drawn from the discrete uniform distribution.

The gray shading in the Biased column in FIG. 6 represents customers whose scores changed because of the intrinsic variability. The right-most column of FIG. 6 shows the categories that correspond to the Biased scores. It can be seen that some, but not all, of the Biased scores that are marked in gray do not match with their original category.

The third data set comes from an online survey (hereinafter referred to as CITY). For the CITY survey, about 200 employees of the BRAND were surveyed, and the degree of non-systematic error in their responses to ordinal surveys was examined. The design of the CITY survey is such that along with the biased responses, an approximation to the true underlying unbiased opinions is also collected.

The CITY survey starts with the following question: "In what city do you live?" In the following questions, the participants are asked to enumerate and categorize their satisfaction level in reference to the city they stated.

In the second question, the participants were asked to assign an ordinal score to their general satisfaction toward the city they chose by asking, "Rate your city as a place to live on a scale of 1-10." The next question asks them to self-assign a matching category by asking, "My city is a city to live in," where they had to choose among the three possible categories "great," "okay," or "bad." This question aims at quantifying whether the categories that are binned 1-6, 7-8, and 9-10, are natural to survey participants. In this regard, the CITY survey seeks to identify whether people who replied 1-6 on the second question would mark "bad," whether those who responded 7-8 would mark "okay," and whether those who answered 9-10 would mark "great."

The primary problem with ordinal surveys that measure subjective opinions (i.e., satisfaction level) is that they are not calibrated. In the next two questions, the objective is to gain a sense of the upper and lower bounds of the true underlying scales of the survey respondents. To achieve that, these questions are posed: "What is the highest rating you would ever give in a survey like this?" and "What is the lowest rating you would ever give in a survey like this?"

The CITY survey concludes with a proposition for a semi-ordinal, text-calibrated survey that is used as an approximation to the true underlying unbiased opinions. The second survey question asking to rate the city on an ordinal scale is repeated, but each numeric rating on the scale has a short textual description attached to it. As an example, the choice "7" is replaced by "7) My city is a decent place" and "8" is replaced by "8) My city is very nice," and other numerical ratings are provided with similar descriptions. This allows the participants to calibrate their responses not only to ordinal scales but also to a textual description of what each numerical category means.

Results: The following provides a report of the results from an analysis of the various data sets described above. First, regarding the SYNTH data: Referring again to FIG. 6, the accuracy that corresponds to the Biased column relative to the Unbiased column is 0.4. However, the accuracy of the corresponding categories is 0.7, which is much higher due to the binning effect. The problem with the data shown in FIG. 6 is that the survey scores and corresponding categories are not balanced, which makes the structural learning of each class uneven. Also, this makes the interpretation of the accuracy score nonintuitive. To overcome this challenge, an undersampling methodology is applied to the data in order to balance the classes by repeatedly sampling the minority and majority classes according to the size of the minority class. In the example of FIG. 6, this results in considering only two customers per category each time. The average category accuracy over the balanced set is 0.6, which is a slight decrease that reflects the fact that there are more mismatches in the minority categories. A side effect with far-reaching implications of the inherent variability is that the biased categories go more and more unbalanced for increased variability.

Figure 7:
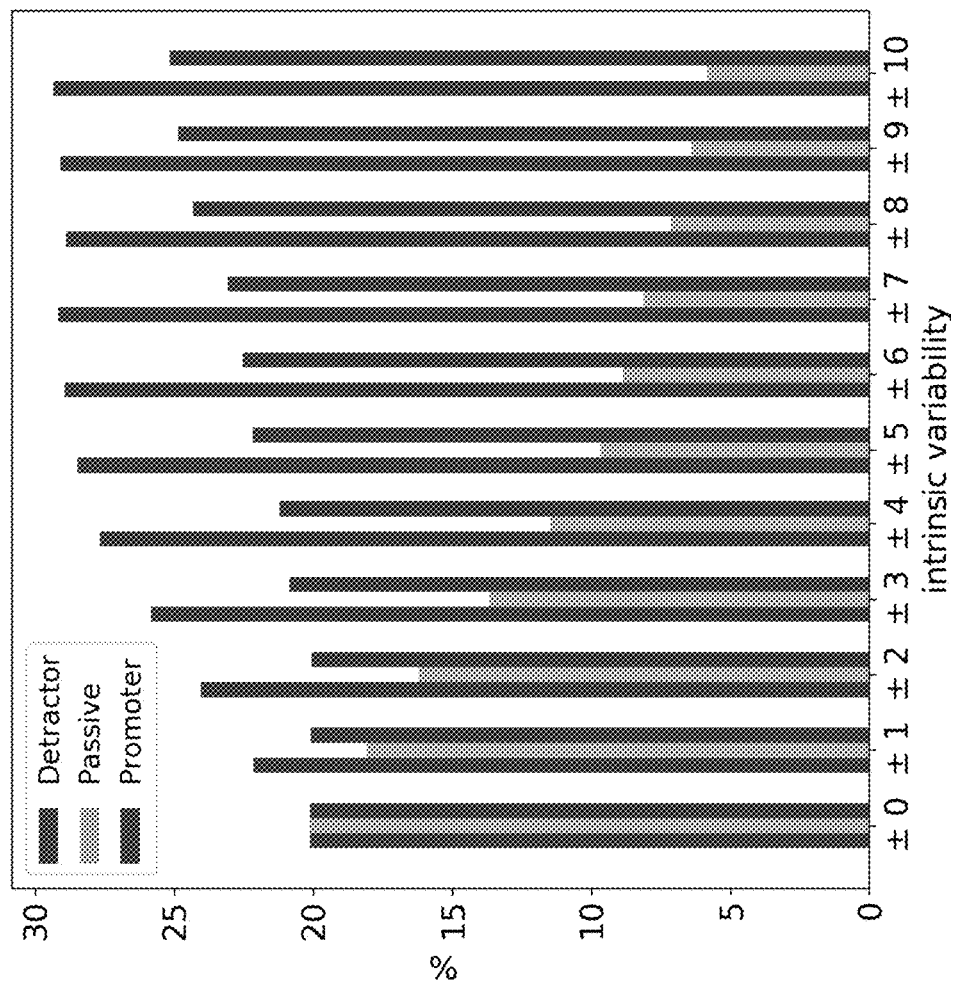
FIG. 7 is a bar graph that illustrates an effect of intrinsic variability on class imbalance with respect to customer survey data.

FIG. 7 is a bar graph 700 that illustrates an effect of intrinsic variability on class imbalance with respect to customer survey data. In particular, FIG. 7 shows how the class imbalance of the Biased category in the SYNTH data develops as a function of the intrinsic variability. When the intrinsic variability equals zero, all three classes are equal in size. In other words, each class takes about 20% of the whole data, as can be seen on the y-axis of FIG. 7. As the intrinsic variability increases, the Detractor category grows in size at a faster rate than the Promoter category. At the same time, the class of Passives shrinks dramatically. This effect is seen because the increased uniform variability accumulates the scores more at the high and low categories than the middle one.

Figure 8:
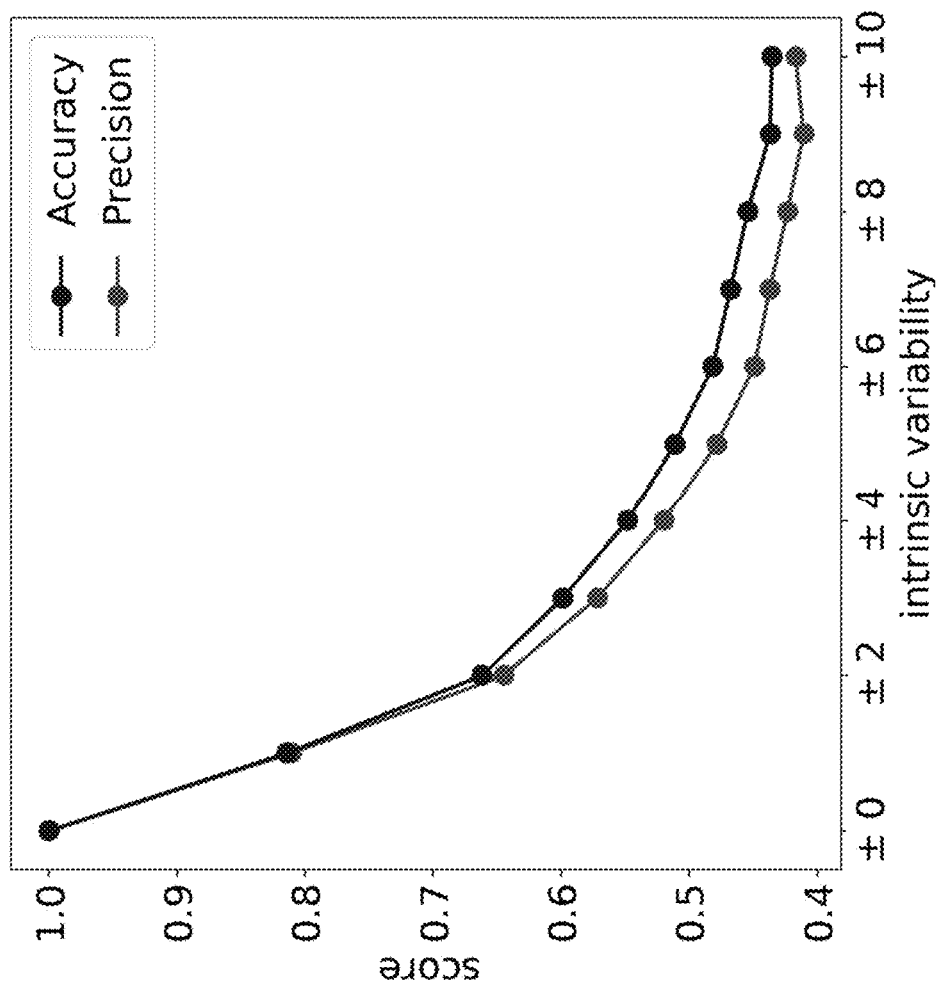
FIG. 8 is a line graph that illustrates how intrinsic variability affects category classification accuracy with respect to customer survey data.

FIG. 8 is a line graph 800 that illustrates how intrinsic variability affects category classification accuracy with respect to customer survey data. Referring to FIG. 8, a key point relates to an evaluation of the effect of the intrinsic variability on the upper-bound classification scores. FIG. 8 shows how the intrinsic variability affects the category classification accuracy and precision scores as the variability increases. When the intrinsic variability is zero, the data is balanced and the upper bounds for both accuracy and precision scores stand at 1. However, as the variability increases, the upper bounds decrease dramatically. Importantly, even for the smallest variability of ±1, there is a 20% decrease in the accuracy and precision upper bounds, i.e., from 1 to about 0.8.

Figure 9:
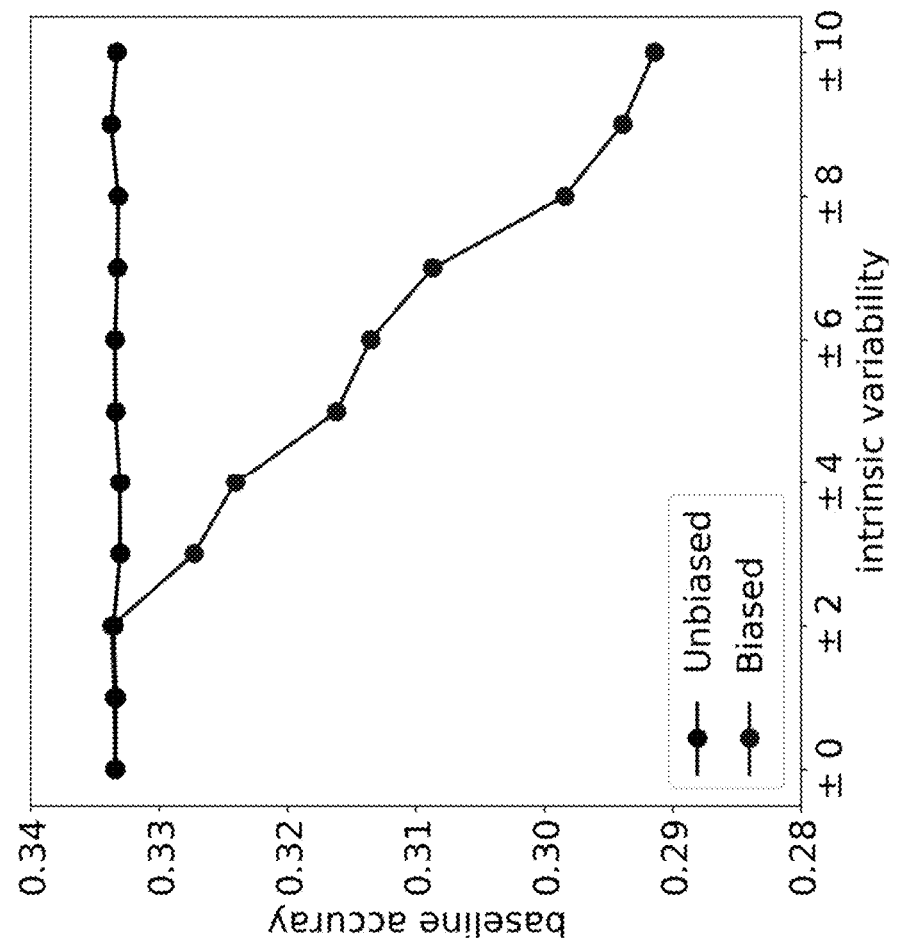
FIG. 9 is a line graph that illustrates how intrinsic variability affects a lower bound of three-class classification accuracy with respect to customer survey data.

FIG. 9 is a line graph 900 that illustrates how intrinsic variability affects a lower bound of three-class classification accuracy with respect to customer survey data. FIG. 9 shows, in a similar manner, how the lower bound of the three-class classification accuracy change as the intrinsic variability increases. The Unbiased score stands at 1/3, which is equal to a random guess over a balanced set of three classes. Conversely, the lower bound on the Biased scores varies as the intrinsic variability increases. This unexpected effect can be traced back to the drastic shrinkage in the Passive category relative to the other categories, as seen in FIG. 7.

The curves in FIGS. 8 and 9 mark the upper and lower bounds for the achievable accuracy and precision scores for the various intrinsic variabilities. In this aspect, the consequence of uneven binning over noisy ordinal labels is that there is a substantial limitation on the predictability that one can expect to extract from the binned data. It is understood that for binned ordinal labels, the non-systematic error does not cancel out but, instead, accumulates and compounds.

Figure 10:
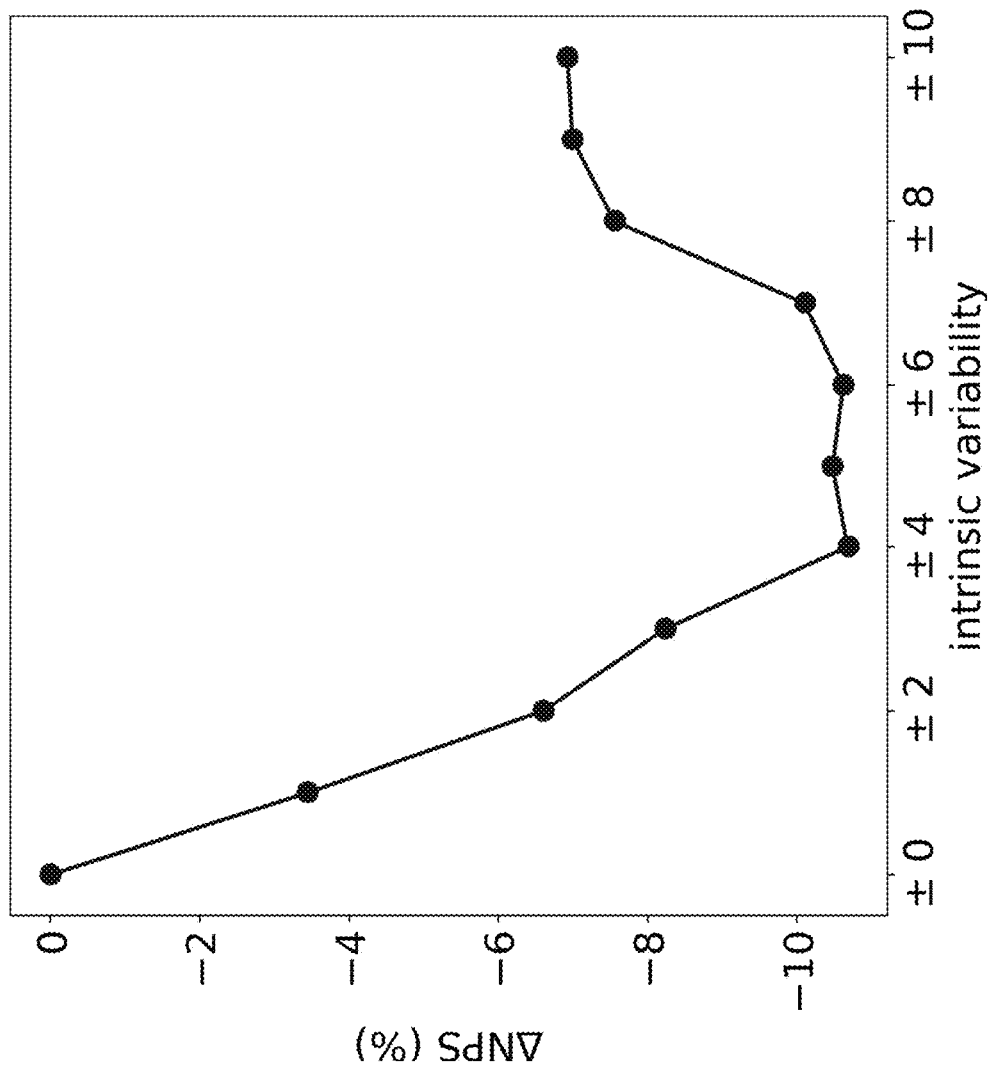
FIG. 10 is a line graph that illustrates an effect of intrinsic variability on NPS scores.

FIG. 10 is a line graph 1000 that illustrates how the binned inherent variability affects the NPS scores. When the intrinsic variability is zero, there is no change to the initial NPS score. As the variability increases, the NPS score starts decreasing, reaching a maximum change of about −10% at intrinsic variability of ±4. However, compared to the change in accuracy scores, there is only a minimal change in the initial NPS, and also the decrease is not monotonic. The reason for this is seen in FIG. 7, i.e., as the variability increases, there is a pronounced gap between the Detractors and Promoters classes. However, this gap maintains almost a constant value. In comparison, the group of Passives decreases dramatically, relative to the Detractors and Promoters classes. In other words, the class imbalance affects the gap accumulation between Passives and the other two categories, thus decreasing the accuracy and precision scores. Conversely, the NPS accounts for the difference between the Promoter and Detractor classes, and these classes maintain a relatively stable ratio even as the intrinsic variability increases.

Figure 11:
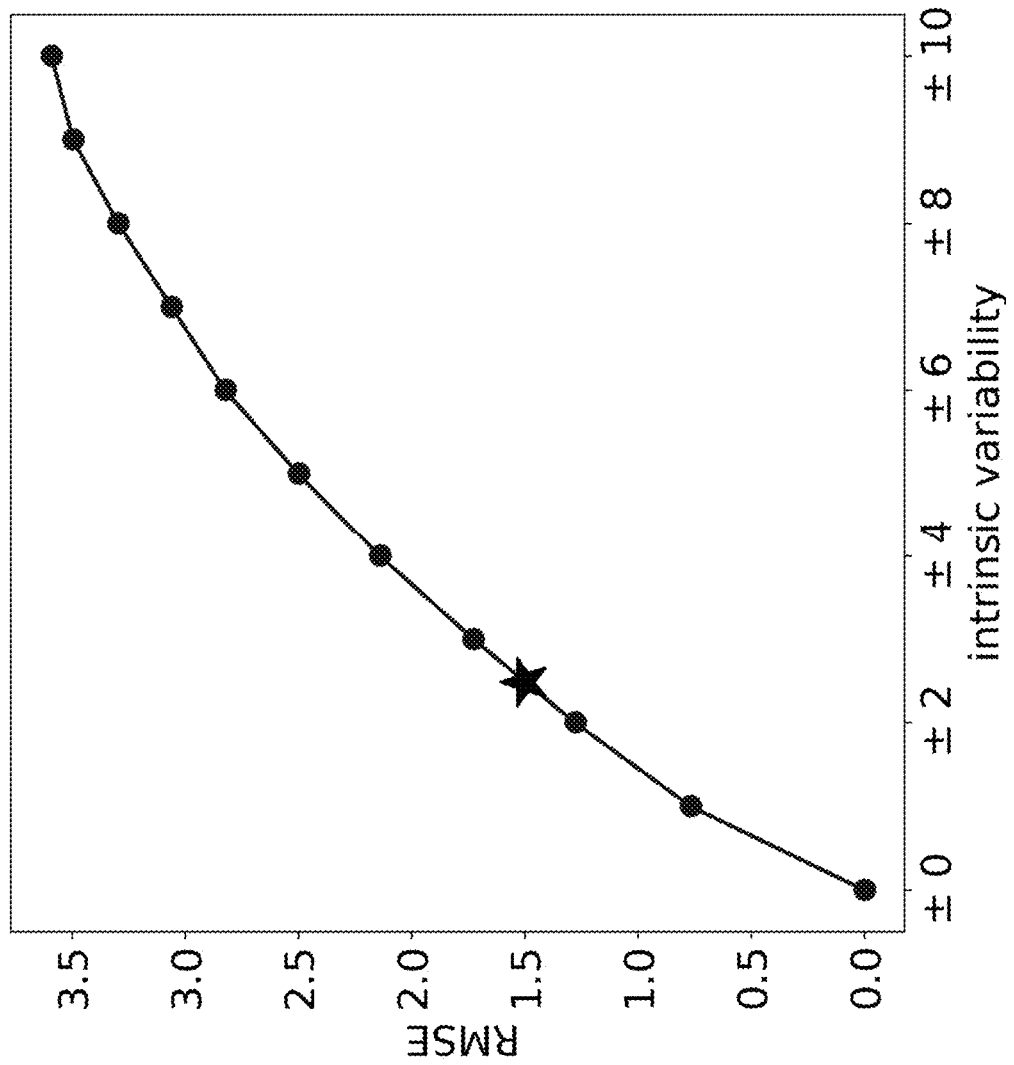
FIG. 11 is a line graph that illustrates a relationship between intrinsic variability and root-mean-square error with respect to customer survey data.

FIG. 11 is a line graph 1100 that illustrates a relationship between intrinsic variability and root-mean-square error with respect to customer survey data. FIG. 11 shows how to estimate the intrinsic variability in real ordinal survey data (i.e., the BRAND data) under the uniform distribution assumption. Referring also to the ten customers example illustrated in FIG. 6, both the classification problem and the regression problem can be understood. Consider the Unbiased score column as the independent variable (say, x) and the Biased score column as the dependent variable (say, y). Then, solve the linear-regression problem by simply regressing y on x, or the Biased scores on the Unbiased scores.

FIG. 11 shows the results of such an experiment applied to the SYNTH data as a function of the increased variability. As expected, the root-mean-square error (hereinafter referred to as RMSE) increases as the inherent variability increases. Similarly, the multivariate linear regression problem may be worked out in order to determine a best fit for a multi-feature real ordinal survey data (i.e., the BRAND data) to its labels (i.e., the survey scores). The key idea is that a survey analyst can then use the RMSE of the real data (after balancing it), equate it to the RMSE of the synthetic data, and read off the inherent variability of the real data from FIG. 11. This is important, as the inherent variability puts an upper bound on the achievable accuracy and predictability skill in the data, as illustrated in FIG. 8. For the BRAND data, this procedure results in an estimate for the inherent variability to be approximately equal to ±2.5 (marked by a star), which means that the upper bound on accuracy scores for the three-class category classification data is approximately equal to 0.65 (see FIG. 8).

As described above, the uniform intrinsic variability assumption allows an analyst to relate and estimate the variability in real surveys, and this results in an estimated upper bound on the achievable real data classification metrics.

The practical consequence is that there is a difference between the actual classification score that can be extracted from the data using machine-learning classification algorithms and the effective score relative to its upper bound. For example, if the balanced three-class classification problem of the BRAND data is solved and an actual accuracy of 0.55 is achieved, when put in perspective of its upper bound, this means that the relative accuracy of the data is 0.55/0.65 or 0.85, i.e., a number that is almost twice as large as the raw accuracy. In other words, the accuracy is still 0.55, but relative to the amplitude of noise in the ordinal labels, the model methodology is able to extract most, or 85%, of the predictability in the data.

The foregoing is based on a case for which the categories were decided by using a specific scheme for unevenly-spaced binning. However, there may be a better binning design for the ordinal scores to minimize the effect on the non-systematic error accumulation. To make this determination, an experiment is conducted by which all the ways by which one can split the ten ordinal scores into three categories are considered. In an example, one split can be [1-3, 4-6, 7-10], while another can be [1-3, 4-7, 8-10], or [1-6, 7-8, 9-10] as in the case described above. In this aspect, there are 45 ways to split the scores into three bins. To summarize the performances for each possible split, the length of the middle class is computed. For example, the three designs mentioned above will get the values of 3, 4, and 2, respectively.

Figure 12:
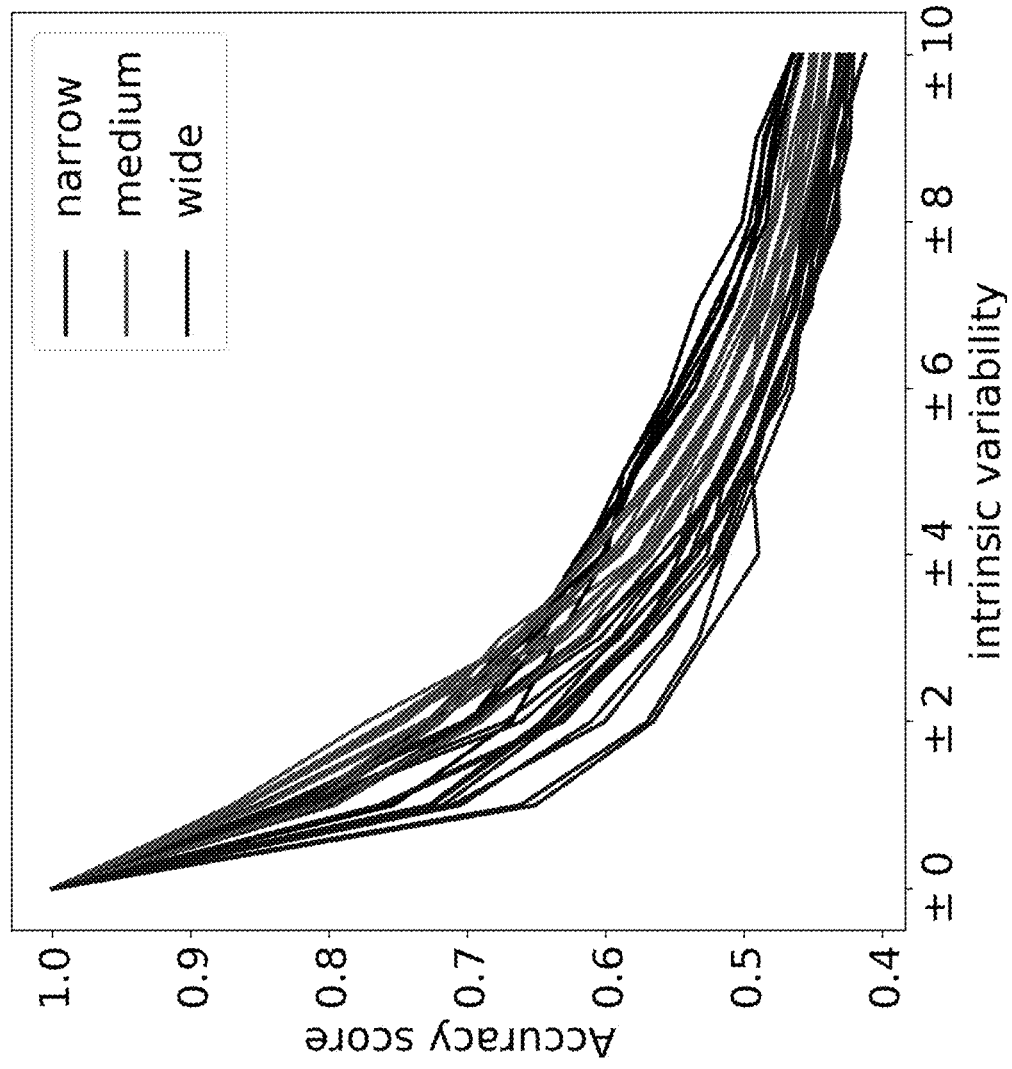
FIG. 12 is a set of line graphs that illustrates an effect of three-class category design on achievable accuracy with respect to customer survey data.

FIG. 12 is a set of line graphs 1200 that illustrates an effect of three-class category design on achievable accuracy with respect to customer survey data. In particular, FIG. 12 shows the results of the analysis where "narrow" denotes middle-class lengths of less than 3, "medium" denotes lengths between 3 and 5, and "wide" denotes lengths of 6 and above. The graphs show that for variability values at or less than ±3, the best configuration is "medium," while for variability above ±3, the best configuration is "wide." For all cases, the worst configuration is "narrow." The intuition behind this result is quite simple: for "narrow" middle-class configuration, even small variability causes significant leakage from the middle category, which reduces accuracy scores. Conversely, for high variability, the best configuration is "wide" because the broad middle category remains relatively untouched while the upper and lower classes accumulate as well. For low variability, the "medium" configuration is best as it preserves stable accuracy for the small perturbations.

It is important to note that the envelope of curves per design in FIG. 12 spans about 0.15-0.2 in accuracy scores. This means that the binning design has vast implications on the deterioration rate of the classification scores.

Figure 13:
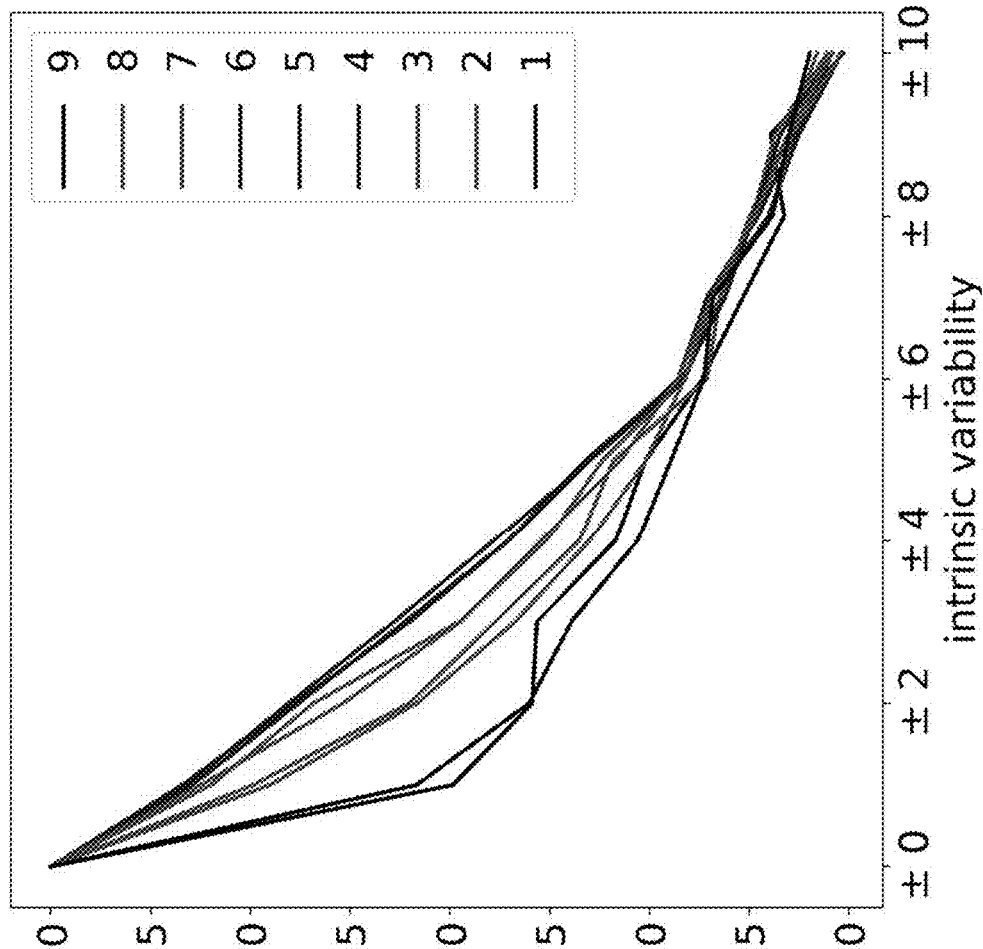
FIG. 13 is set of line graphs that illustrates an effect of two-class category design on achievable accuracy with respect to customer survey data.

FIG. 13 is set of line graphs 1300 that illustrates an effect of two-class category design on achievable accuracy with respect to customer survey data.

For completeness, the analysis described above with respect to FIG. 12 may be repeated for the case of a two-way category split, e.g., [1-7, 8-10] or [1-5, 6-10]. In this scenario, there are only nine possible splits, and the different configurations may be denoted by computing the lengths of the top class, i.e., the above two settings correspond to lengths of 3 and 5, respectively. In this aspect, FIG. 13 shows that the best settings are those that have an even split (i.e., 4, 5, or 6) and that as the splits get more and more uneven, the achievable accuracy decreases even more.

The results of the CITY survey data are examined in view of a goal of exploring ways to reduce the accumulation of non-systematic error.

Figure 14:
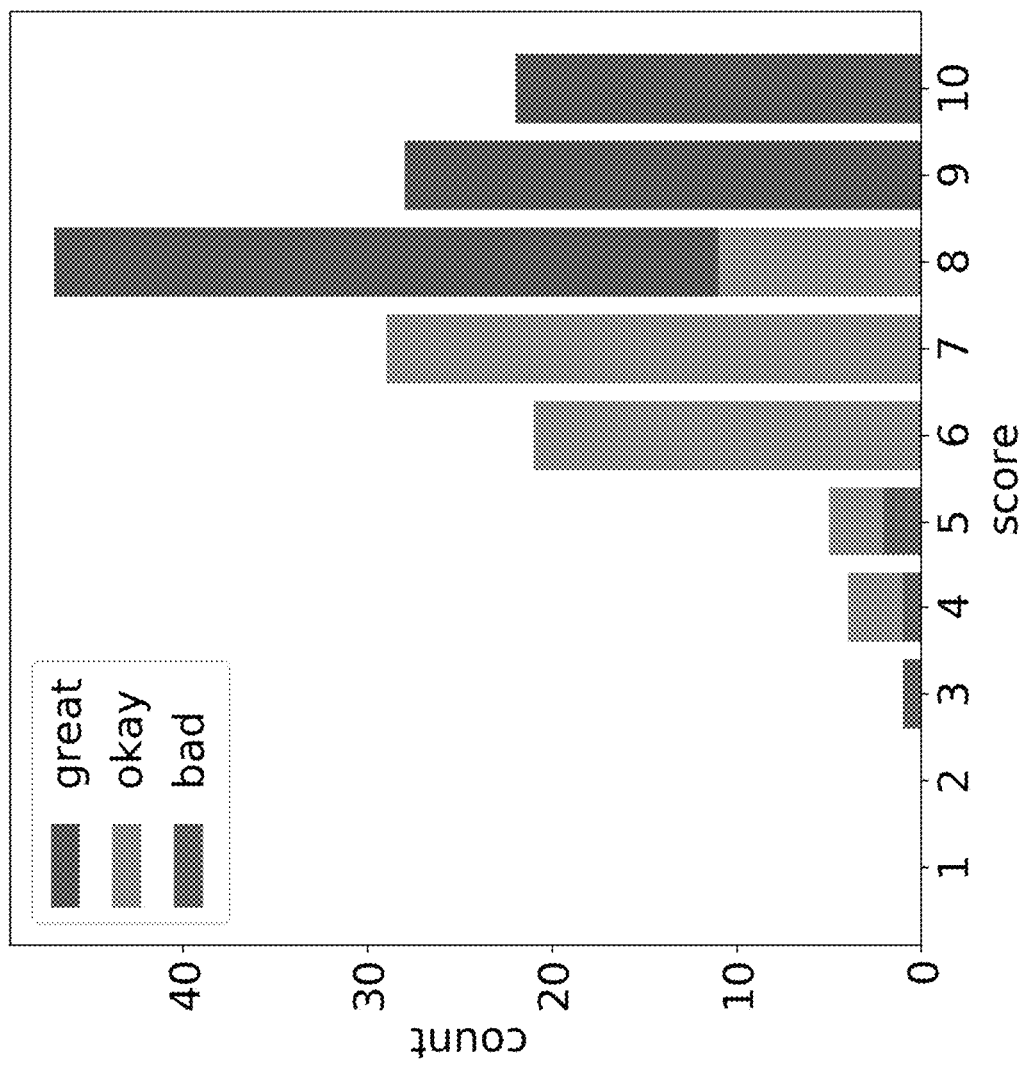
FIG. 14 is a bar graph that illustrates a set of customer survey data.

The CITY survey data provides a different, independent perspective. For the CITY survey, about 200 individuals from over 50 different cities spanning over Argentina, China, Hungary, India, Israel, Singapore, the United States, and the UK were surveyed. As described above, respondents were required to subjectively rate their city as a place of living. FIG. 14 is a bar graph 1400 that illustrates responses to the question: "Rate your city as a place to live on a scale of 1-10." As shown in FIG. 14, most respondents gave their cities high scores of 6 and above. However, no respondents gave a rating below 3. Next, the respondents were asked to assign a category to the numerical score. FIG. 14 shows, interestingly, that respondents assign 8-10 to the top category, 4/5-7/8 to the middle one, and 3-4 to the bottom one.

Figure 15:
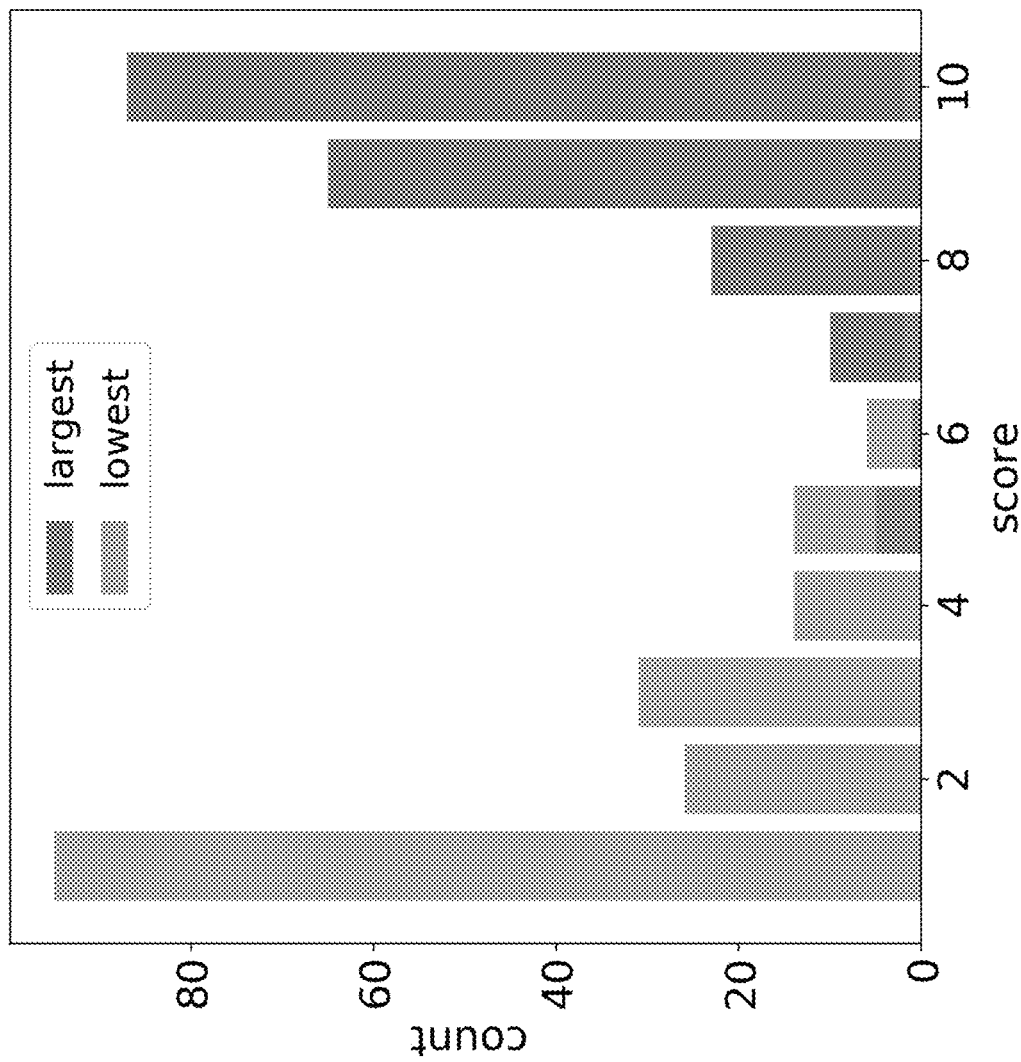
FIG. 15 is a bar graph that illustrates a set of customer survey data.

The fact that no respondent chose to give a score below 3 raises the question of whether respondents even considered using the whole spectrum of possible scores. This question was addressed by asking respondents directly what are the highest and lowest scores they would consider giving in a survey like this, and FIG. 15 is a bar graph 1500 that shows the results. The variability, which is computed as two standard deviations about the mean, is quite significant: the average highest score stands at 9.1±2.3 while the lowest stands at 2.2±3.5. This variability measures the inter-respondent spread, but as a first approximation, it serves as a good measure of the intra-respondent variability.

Figure 16:
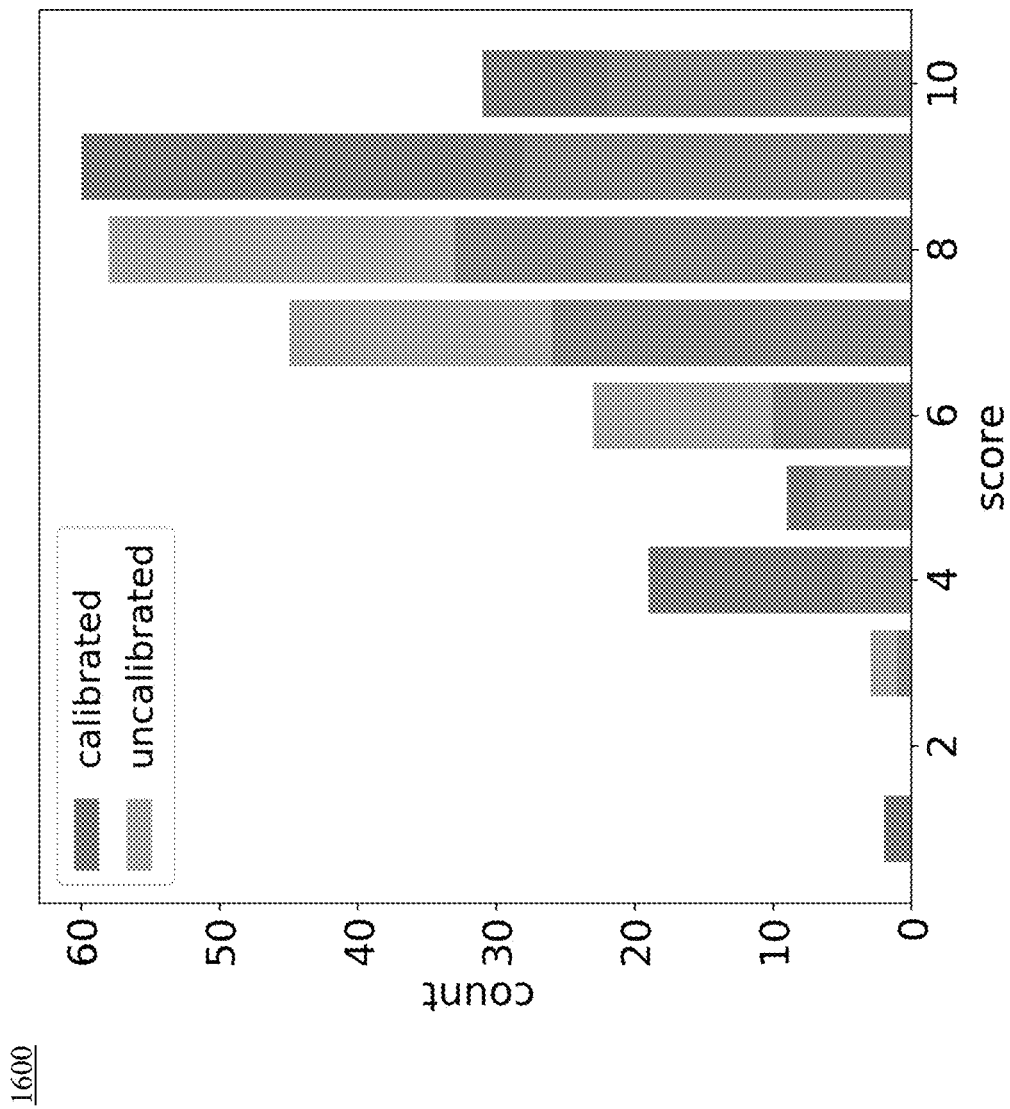
FIG. 16 is a bar graph that illustrates a comparison of spread of customer survey scores in calibrated and uncalibrated surveys.

FIG. 16 is a bar graph 1600 that illustrates a comparison of spread of customer survey scores in calibrated and uncalibrated surveys. In particular, FIG. 16 compares the spread of scores illustrated in FIG. 14 (denoted by "calibrated" survey) to the same question (denoted by "uncalibrated" survey) except where a short description for each score is attached. In an example, the choice "9" is replaced by "9) My city is great and I enjoy living in it" and "6" is replaced by "6) It's been okay I can't complain." FIG. 16 shows that in comparison to the uncalibrated survey, when a short description is added to the numerical values, the survey is essentially calibrated, and as a byproduct, the distribution of responses becomes more uniform, i.e., survey respondents give responses from a broader range of scores. To test for uniformity, the Chi-square test may be applied to both the uncalibrated and calibrated results that are seen in FIG. 16. This produces the result that the calibrated count has p-values 4-orders of magnitude larger, mainly due to the population of the minimum scale, thus indicating that the calibrated survey is closer to uniformity than its uncalibrated counterpart. These findings are robust to both omitting scores less than 3, and when considering the log transformation.

Accordingly, with this technology, an optimized process for implementing methods and systems for identifying and filtering out noise in an ordinal customer survey by using a synthetic survey with constraint variability is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for evaluating and filtering uncertainty in survey data, the method being implemented by at least one processor, the method comprising:
   receiving a plurality of survey responses with respect to a customer survey;
   obtaining a first set of numerical survey data based on the received plurality of survey responses;
   generating, by the at least one processor, a second set of numerical survey data based on a random sampling of a predetermined number of synthetically generated survey responses;
   adjusting, by the at least one processor, the second set of numerical survey data based on a predetermined intrinsic variability factor;
   computing, by the at least one processor, an estimated error value for the adjusted second set of numerical survey data;
   determining, by the at least one processor, an uncertainty of the first set of numerical survey data based on the computed estimated error value; and
   adjusting, by the at least one processor, the first set of numerical survey data based on the determined uncertainty,
   wherein each of the first set of numerical survey data and the second set of numerical survey data includes, for each respective survey response from among the received plurality of survey responses, a corresponding numerical value that falls within a predetermined numerical range, and
   wherein the method further comprises:
   dividing the predetermined numerical range into a plurality of bins, each respective bin having a corresponding numerical sub-range that does not overlap with a numerical sub-range that corresponds to any other bin from among the plurality of bins;
   assigning each respective survey response from among the received plurality of survey responses into a corresponding bin from among the plurality of bins based on the corresponding numerical value of the respective survey response; and
   when each respective survey response has been assigned to a corresponding bin, using a result of the assigning to determine a Net Promoter Score (NPS) that relates to the customer survey,
   wherein the assigning of each respective survey response into the corresponding bin is performed by applying a predetermined machine-learning classification algorithm to the received plurality of survey responses.

2. The method of claim 1, further comprising: before the receiving of the plurality of survey responses, calibrating the customer survey by associating each respective numerical value with a textual description.

3. The method of claim 1, wherein each corresponding numerical value includes an integer value that falls within the predetermined numerical range.

4. The method of claim 3, wherein the predetermined numerical range includes a range of between one (1) and ten (10), and wherein the predetermined intrinsic variability factor is equal to plus-or-minus one ($\pm 1$).

5. The method of claim 1, wherein the predetermined number of synthetically generated survey responses includes a set of numerical values that is uniformly distributed with respect to the predetermined numerical range.

6. The method of claim 1, wherein the adjusting of the first set of numerical survey data comprises reassigning each respective survey response from among the received plurality of survey responses into a corresponding bin from among the plurality of bins based on an adjusted corresponding numerical value of the respective survey response, and using a result of the reassigning to determine an adjusted NPS.

7. The method of claim 6, wherein the predetermined numerical range includes a range of between one (1) and ten (10), and wherein the plurality of bins includes exactly three (3) bins.

8. The method of claim 6, wherein the predetermined numerical range includes a range of between one (1) and ten (10), and wherein the plurality of bins includes exactly two (2) bins.

9. A computing apparatus for evaluating and filtering uncertainty in survey data, the computing apparatus comprising:
   a processor;
   a memory; and
   a communication interface coupled to each of the processor and the memory,
   wherein the processor is configured to:
      receive, via the communication interface, a plurality of survey responses with respect to a customer survey;
      obtain a first set of numerical survey data based on the received plurality of survey responses;
      generate a second set of numerical survey data based on a random sampling of a predetermined number of synthetically generated survey responses;
      adjust the second set of numerical survey data based on a predetermined intrinsic variability factor;
      compute an estimated error value for the adjusted second set of numerical survey data;
      determine an uncertainty of the first set of numerical survey data based on the computed estimated error value; and
      adjust the first set of numerical survey data based on the determined uncertainty,
   wherein each of the first set of numerical survey data and the second set of numerical survey data includes, for each respective survey response from among the received plurality of survey responses, a corresponding numerical value that falls within a predetermined numerical range, and
   wherein the processor is further configured to:
      divide the predetermined numerical range into a plurality of bins, each respective bin having a corresponding numerical sub-range that does not overlap with a numerical sub-range that corresponds to any other bin from among the plurality of bins;

assign each respective survey response from among the received plurality of survey responses into a corresponding bin from among the plurality of bins based on the corresponding numerical value of the respective survey response; and when each respective survey response has been assigned to a corresponding bin, use a result of the assigning to determine a Net Promoter Score (NPS) that relates to the customer survey, wherein the processor is further configured to perform the assignment of each respective survey response into the corresponding bin by applying a predetermined machine-learning classification algorithm to the received plurality of survey responses.

10. The computing apparatus of claim 9, wherein the processor is further configured to: before the receiving of the plurality of survey responses, calibrate the customer survey by associating each respective numerical value with a textual description.

11. The computing apparatus of claim 9, wherein each corresponding numerical value includes an integer value that falls within the predetermined numerical range.

12. The computing apparatus of claim 9, wherein the predetermined numerical range includes a range of between one (1) and ten (10), and wherein the predetermined intrinsic variability factor is equal to plus-or-minus one (±1).

13. The computing apparatus of claim 9, wherein the predetermined number of synthetically generated survey responses includes a set of numerical values that is uniformly distributed with respect to the predetermined numerical range.

14. The computing apparatus of claim 10, wherein the processor is further configured to adjust of the first set of numerical survey data by reassigning each respective survey response from among the received plurality of survey responses into a corresponding bin from among the plurality of bins based on an adjusted corresponding numerical value of the respective survey response, and to use a result of the reassigning to determine an adjusted NPS.

15. The computing apparatus of claim 14, wherein the predetermined numerical range includes a range of between one (1) and ten (10), and wherein the plurality of bins includes exactly three (3) bins.

16. The computing apparatus of claim 14, wherein the predetermined numerical range includes a range of between one (1) and ten (10), and wherein the plurality of bins includes exactly two (2) bins.

17. A non-transitory computer readable storage medium storing instructions for evaluating and filtering uncertainty in survey data, the storage medium comprising executable code which, when executed by a processor, causes the processor to:

receive a plurality of survey responses with respect to a customer survey;

obtain a first set of numerical survey data based on the received plurality of survey responses;

generate a second set of numerical survey data based on a random sampling of a predetermined number of synthetically generated survey responses;

adjust the second set of numerical survey data based on a predetermined intrinsic variability factor;

compute an estimated error value for the adjusted second set of numerical survey data;

determine an uncertainty of the first set of numerical survey data based on the computed estimated error value; and adjust the first set of numerical survey data based on the determined uncertainty, wherein each of the first set of numerical survey data and the second set of numerical survey data includes, for each respective survey response from among the received plurality of survey responses, a corresponding numerical value that falls within a predetermined numerical range, and wherein the executable code further causes the processor to:

divide the predetermined numerical range into a plurality of bins, each respective bin having a corresponding numerical sub-range that does not overlap with a numerical sub-range that corresponds to any other bin from among the plurality of bins;

assign each respective survey response from among the received plurality of survey responses into a corresponding bin from among the plurality of bins based on the corresponding numerical value of the respective survey response; and when each respective survey response has been assigned to a corresponding bin, use a result of the assigning to determine a Net Promoter Score (NPS) that relates to the customer survey, wherein the executable code further causes the processor to perform the assignment of each respective survey response into the corresponding bin by applying a predetermined machine-learning classification algorithm to the received plurality of survey responses.

18. The storage medium of claim 17, wherein the executable code is further configured to cause the processor to: before the receiving of the plurality of survey responses, calibrate the customer survey by associating each respective numerical value with a textual description.

* * * * *